Patented Dec. 5, 1939

2,182,473

UNITED STATES PATENT OFFICE 2,182,473

PROCESS FOR INCREASING THE APPARENT DENSITY OF CHLORINATED RUBBER

Walter E. Gloor, Highland Park, N. J., assignor to Hercules Powder Company, Wilmington, Del., a corporation of Delaware No Drawing. Application September 16, 1937, Serial No. 164,236

4 Claims. (Cl. 260—772)

This invention relates to a process for increasing the apparent density of chlorinated rubber, comprising rolling or mechanically compressing the water-wet material to reduce the porous structure and to the product thereof.

Chlorinated rubber is usually prepared by chlorinating a solution of rubber in a suitable solvent such as, for example, carbon tetrachloride, and separating the chlorinated derivative so obtained by evaporating the solution by contact with an agitated liquid, usually water, which is immiscible with the solvent and with the solid product and which is maintained above the boiling point of the solvent, thereby producing a porous, spongy chlorinated rubber, which, after drying, has an apparent density of only about 5 to about 8 pounds per cubic foot.

Examination of the particles so produced indicates a porous internal structure, which obviously can be crushed to give a denser product. However, when an attempt is made to crush the dry powder on a cold roll, fusion results at some points due to the heat generated with consequent discoloration of the product. Various other methods have been tried in the past but none of them produced very suitable products. For many purposes this fluffy, porous product is undesirable and it is the object of this invention to provide a method whereby a product of higher apparent density is obtained.

Now in accordance with my invention, I have found that if chlorinated rubber, wet with water or with any other nonsolvent for the chlorinated rubber, is crushed while wet, by mechanical means, a product results having a high apparent density.

More specifically, I have found that if water-wet chlorinated rubber as it comes from the centrifuge, or directly from the precipitator as hereinafter described, following precipitation, is squeezed through close-set, hard-surfaced pressure rolls, large amounts can be fed through with no harm to the color of the product, and that in so doing a product results having an apparent density of not less than about 15 pounds per cubic foot, desirably from about 15 to about 35 pounds per cubic foot, and preferably from about 25 to about 28 pounds per cubic foot, when dry, depending upon the distance between the rolls and the diameter of the rolls. As mentioned before, the apparent density of the untreated product is only about 5 to about 8 pounds per cubic foot.

Wherein the specification and claims I refer to the apparent density of chlorinated rubber, I mean apparent density as determined in the following manner: A 250 cc. graduated cylinder is filled with the dried chlorinated rubber and the said cylinder is then tapped 25 times on a large cork, placed on a table, from a height of about 2 to 3 inches, thus tamping down the charge. The volume (V) of the tamped material is then read and the contents of the cylinder weighed, giving the weight (W). The apparent density, accurate within 5%, is calculated from the formula below $$\text{Apparent density (lbs. per cu. ft.)} = \frac{W}{V} \times 62.4$$

The process according to my invention is contemplated not only to involve the rolling of the chlorinated rubber taken directly out of the centrifuge, but also the rolling of the chlorinated rubber emerging from the precipitator on an endless screen belt and the deposition of this wet chlorinated rubber between the rolls, without centrifuging, where water is squeezed out and the apparent density increased, the rolled product then draining further on an endless screen belt which conveys it to a continuous drier. Practically any size roll may be used in my process, the size depending upon the amount of the product to be processed per hour. The nips and the speed of the rolls may be adjusted to fit any particular situation.

Although the water-wet chlorinated rubber has a small but appreciable hydrochloric acid content, an ordinary steel roll may be used in my process without contamination of the product, provided that the rolls be kept wet at all times. Stainless steel, monel metal, nickel or nichrome facings on the rolls may be used in place of the ordinary steel rolls. Likewise, hard asbestos filled phenol-formaldehyde resin rolls or very hard rubber rolls may also be used. The purpose of the faced rolls or of the composition rolls is the elimination of any possibility of contamination.

I have found, however, that soft rolls, such as, for example, those ordinarily used in wash wringers or even those used as squeeze rolls in the dewatering of cotton linters, or pulp, are not completely effective for my process because they do not crush the chlorinated rubber particles sufficiently and hence do not increase the apparent density of either wet or dry chlorinated rubber to any substantial degree.

As a specific example of the practical embodiment of my invention, I took water-wet chlorinated rubber, containing about 60% water, from the centrifuge after precipitation. I then passed this material through a 6 inch by 10 inch mixing roll with a setting of 0.010 inch and a speed of 32 R. P. M. and 24 R. P. M. on the two rolls. Approximately 60 pounds (dry weight) of chlorinated rubber were put through these rolls in an hour, the water content of the product being reduced from 60% to 45% by the rolling treatment. After drying the rolled product, the apparent density was 27.5 pounds per cubic foot compared with an apparent density of approximately 5 pounds per cubic foot before rolling.

The rolled chlorinated rubber is not only of good color, clarity and stability, but it dries at least 25% faster than the unrolled material when put through the continuous drier. The rolled product leaves the rolls in flakes, which are quite friable and which break up into reasonably sized pieces on a mechanical conveyor system, for example, which feeds them to a drier. I have found that this higher apparent density chlorinated rubber is equally as suitable as the unrolled rubber for rapid resolution in the production of varnishes, paints, lacquers, films or the like, but in addition my product has the advantage that the waste in handling because of "dusting", is definitely less than that of the lighter product of the prior art. Furthermore, much greater quantities of my product can be put in a container of a given size which is an economy in both shipping and storing.

It will be understood that rolling is not the only method by which the apparent density of chlorinated rubber may be increased. The water-wet chlorinated rubber may, for example, be crushed between parallel plates or it may be pushed through a slotted plate by a hinged crusher jaw and scraped off the bottom or it may be treated in other known ways which make use of this same principle of crushing the product while it is wet. Ordinarily the chlorinated rubber will be water-wet when rolled but other non-solvents for the chlorinated rubber such as, for example, petroleum naphthas, lower aliphatic alcohols, such as methyl alcohol or ethyl alcohol may also be used.

What I claim and desire to protect by Letters Patent is:

1. A method for increasing the apparent density of chlorinated rubber which comprises crushing, by the application of pressure, wet, fluffy, porous particles of chlorinated rubber of low apparent density, while wet with not less than about 45% by weight thereof of water, producing thereby small, thin, chip-like, discrete flakes of chlorinated rubber having an apparent density of at least 15 pounds per cubic foot when dry.

2. A method for increasing the apparent density of chlorinated rubber which comprises crushing between two hard surfaces, by the application of pressure, wet, fluffy, porous particles of chlorinated rubber of low apparent density, while wet with not less than about 45% by weight thereof of water, producing thereby small, thin, chip-like, discrete flakes of chlorinated rubber having an apparent density of at least 15 pounds per cubic foot when dry.

3. A method for increasing the apparent density of chlorinated rubber which comprises crushing between close-set, hard surface rolls, wet, fluffy, porous particles of chlorinated rubber of low apparent density, while wet with not less than about 45% by weight thereof of water, producing thereby small, thin, chip-like, discrete flakes of chlorinated rubber having an apparent density of at least 15 pounds per cubic foot when dry.

4. Chlorinated rubber in the form of small, thin, chip-like, discrete flakes, having an apparent density of at least 15 lbs. per cubic foot when dry, produced in accordance with the method of claim 1.

WALTER E. GLOOR.